June 27, 1939.  J. B. LINTERN  2,163,911
SANDING DEVICE FOR VEHICLES
Filed Oct. 30, 1936

INVENTOR
JOHN B. LINTERN
BY
*John Harrow Keenend,*
ATTORNEY

Patented June 27, 1939

2,163,911

UNITED STATES PATENT OFFICE 2,163,911

SANDING DEVICE FOR VEHICLES

John B. Lintern, Cleveland, Ohio, assignor to The Lintern Corporation, Cleveland, Ohio, a corporation of Ohio Application October 30, 1936, Serial No. 108,439

4 Claims. (Cl. 291—44)

This invention relates to sanding devices for vehicles and is an improvement in the devices disclosed and claimed in my co-pending application, Ser. No. 94,974, filed August 8, 1936. For the purposes of illustration the present invention will be described in connection with automotive vehicles which operate on the highways, as distinguished from vehicles which operate on trackways, as the problems of maintaining the proper discharge of sand and the proper placement thereof in front of the vehicle wheels are rendered more difficult of solution in the case of highway vehicles due to the conditions under which the vehicles must necessarily operate. As examples of the problems presented, the sand or other material discharged by the sander must be delivered to the highway surface and discharged immediately in front of the wheels.

This accurate discharge and placement of the material is necessary because highway vehicles tend to skid laterally as well as forwardly and it is necessary therefore that the sand be discharged so that the least forward motion of the vehicle will dispose the wheels of the vehicle on a sanded area of the highway whereby the skidding can be arrested and control of the vehicle regained.

Again, the flow of water on the highway surface will carry away the sand from the path of the car rapidly and the discharge must be effected sufficiently close to the wheels so that the wheels reach the sanded area before the action of the water can become effective. To discharge the sand in such a position the discharge hose or conduit must be directly exposed in front of the wheel and close to the highway surface. Necessarily, in this position the discharge conduit is subjected to the spray and splash from the pneumatic tires of the vehicle and road splash occasioned by passing vehicles. In fact, in the case of pneumatic tires operating on a wet pavement, the spray and splash effects are so pronounced that a substantially continuously flowing stream of water is discharged at the location at which it is necessary to place the discharge conduit of the sander. The problem cannot be solved by positioning the discharge conduit at a higher level so as to escape this stream as the sand itself will be carried away by the stream of water before reaching the pavement. Swirling air and snow would have a like effect. It is necessary therefore that a conduit be provided which will operate effectively and without clogging while subjected to all of these adverse conditions. The usual splash guards and like accessory equipment cannot be used effectively at this location as the vehicles at times must operate over surfaces having obstructions which would strike and damage such guards with the result that they might not operate effectively to prevent the entrance of moisture into the discharge conduit.

It has been found that when the sand discharge conduit is exposed directly to road spray and splash, moisture or water is thrown into the interior of the discharge conduit and moistens or wets the interior walls thereof adjacent the discharge end as a result of which the sand adheres to the walls, gradually accumulating more moisture, until the conduit is bridged across and clogged by damp sand. For partly overcoming this difficulty, the discharge conduit is made of rubber or water proof hose which not only reduces the entrance of moisture to some extent but also can readily be deformed to break loose any lumps or accumulations of damp sand, or snow and ice. Even with this structure, however, clogging sometimes occurs at the discharge end of the discharge conduit. Safety demands, however, that the sand be discharged properly and without failure each time the device is operated.

The principal objects of the present invention, therefore, are to assure the proper discharge of the sand at each operation of the device and to eliminate clogging of the discharge conduit thereby.

A correlative object is to admit the sand into the discharge conduit of the device in a manner such that the sand is constrained to a compact, flowing stream coaxial with the discharge conduit and in spaced relation to the side walls thereof.

Another object is to provide a discharge conduit so configured as to reduce the entrance of road spray and splash thereinto and any tendency of clogging.

Other objects and advantages will become apparent from the following specification wherein reference is made to the drawing in which, Fig. 1 is a side elevation of a motor vehicle with the device of the present invention installed;

Figure 1:
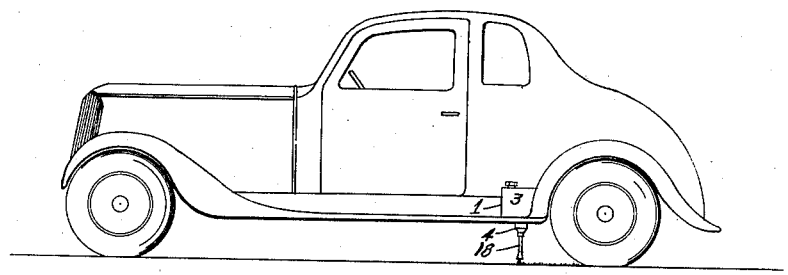

For the purposes of illustration, the present invention will be described in connection with a device for discharging sand in front of the rear wheels of an automotive vehicle of the pleasure car type, its use in connection with other pulverized or granulated material and for other types of vehicles being readily apparent from the illustrative example.

Referring to the drawing, the device designated generally at 1, is shown in connection with a motor vehicle and comprises a hopper 3 from which sand is to be supplied to a discharge conduit or hose. The hopper 3 can be mounted on the running board of the vehicle, as illustrated, and fits snugly against the body and front of the rear fender so as to be positioned as closely as possible to the point at which the sand is to be applied. The hopper 3 terminates rearwardly of the car a sufficient distance from the door thereof so as not to interfere with the ingress and egress of passengers. Connected to the bottom of the hopper 3 and exposed beneath the running board of the vehicle is a valve housing 4. The housing 4 encloses and protects a discharge nozzle 5 and is provided at its upper end with an annular flange which abuts a flange of the nozzle 5 in sealed relation. Within the hopper 3 is a rigid supporting member 7 which is likewise provided with a suitable flange in alignment with the flanges of the nozzle 5 and housing 4. Suitable bolts 8 are received through aligned apertures in the flanges and clamp the flanges tightly together and to opposite faces of the bottom wall of the hopper 3 to form sealed joints. Carried on the support 7 within the hopper 3 is a control valve which may be any of the types described in my co-pending application, and controlled as therein disclosed. The control valve preferably comprises a selectively operable solenoid 9 and a return or seating spring 10, both of which are operatively associated with the stem 11 of the valve. Carried on the lower end of the valve stem 11, for cooperation with the discharge nozzle 5 is a valve plug 12. The plug 12 has a seating portion 13, the upper or operating face of which is frustro-conical and has an angle of slope preferably of 20° to the horizontal. The portion 13 is substantially the same in diameter as the discharge nozzle 5. Connected to the lower end of the housing 4 is a sleeve header 15 having a cylindrical portion at its upper end which is snugly received within the housing 4, as illustrated, the housing 4 preferably being of resilient rubber and being stressed into engagement with the cylindrical portion of the header 15 by means of a conventional clamping band 16. The inner walls of the header sleeve 15, below the cylindrical portion, define an inverted frustro-conical surface having an angle of slope of substantially 60 degrees to the horizontal, the diameter of the lower base of the frustro-conical portion of the header 15 being about 1 inch. The header 15 terminates at its lower end in a cylindrical portion 17 which receives the upper end of a resilient rubber discharge conduit 18. The discharge conduit 18, in turn, is preferably tapered from about 1 inch diameter at its upper end to about ¾ of an inch diameter, and therebelow is flared outwardly abruptly to considerably larger diameter to provide a large diameter water and wind guard portion 19. The nozzle 5, the valve 12, the housing 4, the header 15, and discharge conduit 18 are all coaxial and preferably extend as near vertically as possible.

The nozzle 5 is preferably in the form of an inverted frustro-conical sleeve and has a sharpened edge about its discharge opening. Due to the sharp edge shape of the valve and nozzle, clogging thereof and improper seating of the valve is prevented. Also, due to the shape of the nozzle 5 and the angle of slope of the seating portion 13 of the valve, all sand, or other granular material, discharged from the hopper 3 is spread into an annular cylindrical stream of material as it drops from the nozzle 5, through the housing 4, and into the header 15. This material impinges on the sloping frustro-conical walls of the header sleeve 15, travels therealong, and discharges at the lower end of the header sleeve downwardly and inwardly toward the axis thereof. The convergent annular stream is thus contracted and formed into a relatively small diameter, solid cylindrical stream positioned axially of and in spaced relation to the walls of the discharge conduit 18 and falls through the conduit 15 while constrained to the spaced relation. Thus it does not come in contact with the sides of the conduit and even though such walls become moist or damp, the flow of sand will continue. Thus clogging is eliminated.

Further to insure that the falling cylindrical stream of sand will not impinge on the side walls of the conduit 15 near the lower end of the conduit, particularly during starting and stopping of the vehicle, the lower portion 19 is of greater diameter, as heretofore described. A very distinct advantage results from the provision of this enlarged discharge portion. It has been found that if a small diameter conduit is used, and an exceedingly small amount of moisture is absorbed by the sand, the sand not only tends to adhere to the side walls of the conduit but also, in time, will accumulate and bridge across from one wall to the other, finally completely blocking the conduit. The portion 19 is sufficiently large in diameter so that such bridging of the sand will be prevented regardless of moisture. This larger diameter portion can be employed without sacrificing the proper placing and concentration of the sand, because of the compact, centrally disposed flowing stream which is produced prior to entry of the sand into the portion 19.

Figure 3:
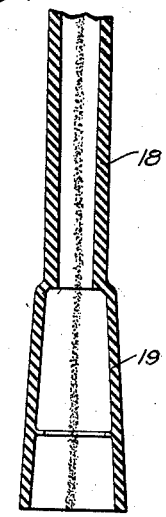
Fig. 3 is a fragmentary sectional view through the discharge conduit of the device.

In order to prevent moisture and water which may strike the lower end of the guard 19 from passing upwardly along the inner walls thereof by capillary attraction and eventually reaching the upper portion of the hose, an internal annular rib is formed on the inside of the guard 19 in spaced relation to the ends thereof. This rib, illustrated in Fig. 3, thus limits the upward passage of any moisture or water so that a free flow of sand into the upper end of the guard 19 results. Further, the walls of the guard 19 are of less thickness than the remainder of the hose so that if the guard strikes an obstruction there is relatively slight danger of damage thereto or to the remainder of the apparatus.

In some instances it is necessary to utilize the structure in connection with dual demountable wheels or tires so that two separate discharge conduits are required. For this purpose, a discharge header 25 is utilized in place of the header 15, the header 25 being provided with two separate discharge portions 26 which extend as near vertically as possible but are slightly divergent downwardly so that each may become aligned with the mid-portion of a different one of the dual wheels. Connected to the discharge portions 26 respectively are discharge conduits 27 which are similar to the conduit 18 and have the enlarged diameter lower end portions similar to the portion 19. Since the stream of sand discharged by the valve is uniformly distributed circumferentially of the valve, it is evenly split, half going to each one of the discharge portions 26 and thence to the discharge conduits 27. Due to the taper of the discharge conduits 27, the sand forms a central stream which will pass through the conduits 27 out of contact with the side walls thereof. In all instances, therefore, moisture which enters the discharge conduits, or which, by capillary attraction, tends to creep up the interior wall thereof, cannot come in contact with the sand. It is desirable that the discharge conduits, in each instance, are arranged as nearly vertical as possible.

Figure 2:
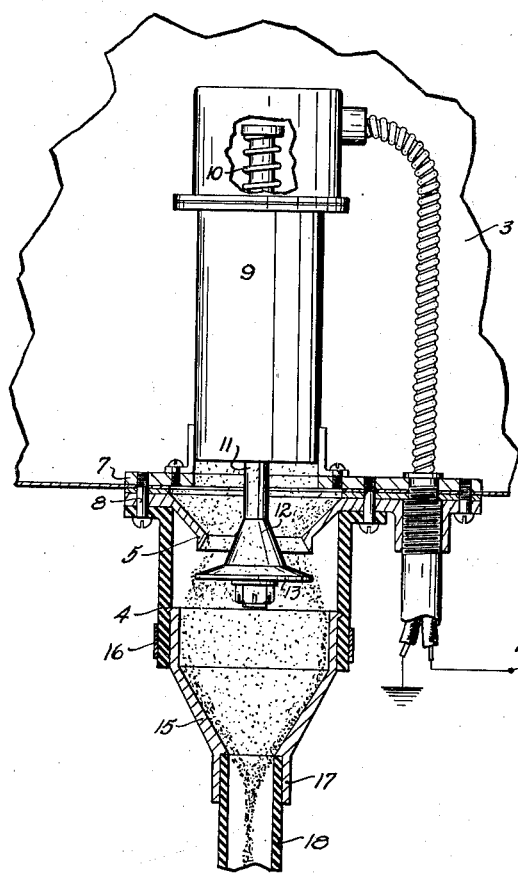
Fig. 2 is an enlarged fragmentary view, partly in section, illustrating the improved features of the present device.
Figure 4:
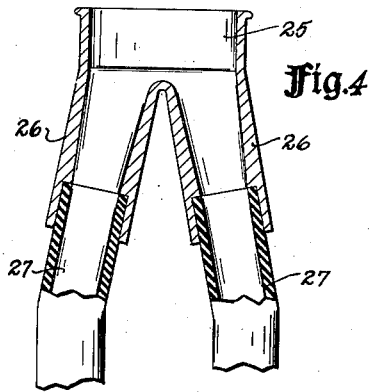
Fig. 4 is a vertical sectional view through a modified form of one of the elements of the device illustrated in Fig. 2.

As described in my copending application, the control valve 12 is operable at the will of the operator. In the form illustrated, wherein the solenoid valve is employed, the valve is operated to discharge sand when the solenoid is operated and is held seated by the spring. The operation of the solenoid may be controlled by the usual electrical switch 28, such as diagrammatically illustrated in connection with Fig. 2, the operating current being supplied from a suitable battery 29.

Having thus described my invention, I claim:

1. A discharge conduit for a sander for the purposes described comprising a flexible rubber hose which terminates at its discharge end at the upper end portion of a depending, elongated, flexible rubber guard portion of greater inside cross section than the inside cross section of the adjacent portion of the hose, and said guard portion having an internal inwardly projecting peripheral rib in spaced relation to its ends for preventing the passage of moisture upwardly along the inner walls of the guard portion.

2. A discharge conduit for a sander of the character described, comprising a flexible moisture-proof hose of rubber composition and adapted to receive sand at its upper end from a sander and terminating at its lower end in the upper end portion of an elongated depending guard which is greater in internal diameter at all portions below the lower end of the hose than the internal diameter of the discharge end of the hose, and the lower end of the passage in the hose flaring gradually outwardly and upwardly for a predetermined distance from its lower end portion.

3. A discharge conduit for a sander of the character described, comprising a flexible moisture-proof hose of rubber composition and adapted to receive sand at its upper end from a sander, said hose terminating at its lower end in the upper end portion of an elongated integral depending guard of flexible rubber composition, which guard is greater in internal diameter at all portions along its length below the point of discharge of the hose than the internal diameter of the discharge end of the hose, and said guard having a wall thickness less than the wall thickness of the remainder of the hose.

4. A discharge means for a sander for the purposes described, comprising a rubber housing in the form of a cylindrical sleeve of constant diameter and having at one end a radially extending external flange for connection with a superposed support, a rigid header sleeve having an upper end portion telescopically received in the end portion of the rubber sleeve opposite from the flange, means for compressing the rubber sleeve around the upper end portion of the header sleeve, said header sleeve having a portion contracted downwardly from its point of connection with the rubber sleeve, a discharge hose of rubber composition connected by one of its ends to the header sleeve below the contracted end portion of the header sleeve and depending therefrom.

JOHN B. LINTERN.